No. 778,919. PATENTED JAN. 3, 1905.
P. THIELMANN & J. MEISENBURG.
MINE CAGE.
APPLICATION FILED JUNE 6, 1904.

No. 778,919. Patented January 3, 1905.

UNITED STATES PATENT OFFICE.

PETER THIELMANN AND JOHANN MEISENBURG, OF DUISBURG, GERMANY.

MINE-CAGE.

SPECIFICATION forming part of Letters Patent No. 778,919, dated January 3, 1905.

Application filed June 6, 1904. Serial No. 211,421.

*To all whom it may concern:*

Be it known that we, PETER THIELMANN and JOHANN MEISENBURG, subjects of the German Emperor, and residents of Duisburg, Germany, have invented new and useful Improvements in Mine-Cages, of which the following is a specification.

This invention relates to a mine-cage which is so constructed that the platform is movable and can be inclined to both sides for facilitating the discharging of the wagons. The wagons are automatically locked in the cage.

Figure 1:
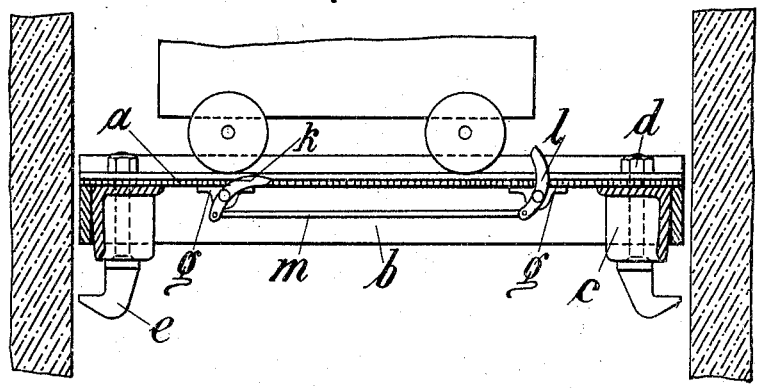
Figure 2:
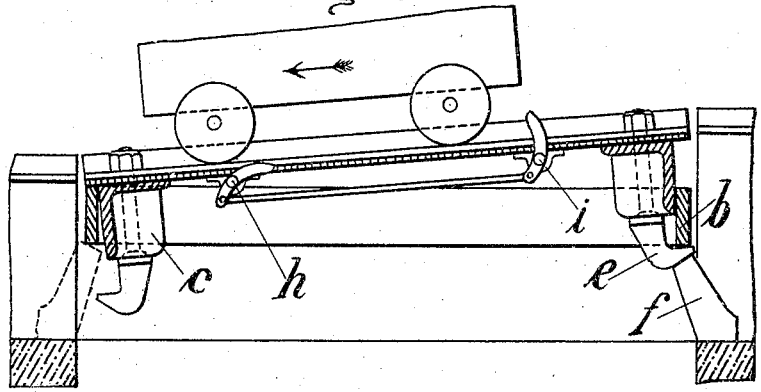
Figure 3:
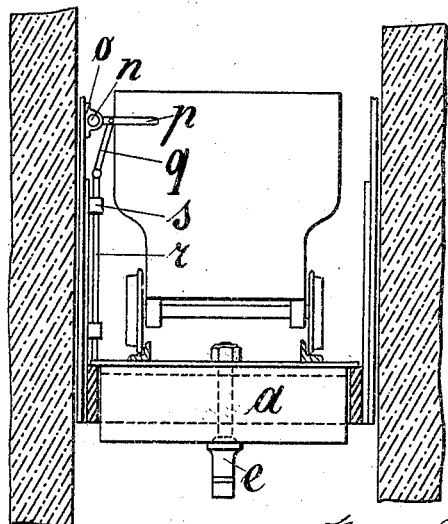

In the accompanying drawings the improved cage is shown, in Figure 1, in a longitudinal section, the platform being in a horizontal position. Fig. 2 shows the cage in a longitudinal section with inclined platform. Fig. 3 is a front view of the cage with the automatical safety device.

The cage is constructed as follows: The platform $a$, with the rails, is loosely mounted in the cage-frame $b$ and is provided at both ends with catches $e$, which are rotatably mounted in bearings $c$ and secured by means of nuts $d$, screwed to their upper ends. On the lower surface of platform $a$ two axles $h$ $i$ are rotatably mounted in bearings $g$, on the ends of which axles curved two-armed levers $k$ $l$ are pivoted, the upper arms of which project through the platform $a$ at the outer side of the rails. The lower arms of the curved levers $k$ $l$ are connected by connecting-rod $m$. At one side of the cage-frame $b$ the safety locking device is arranged, which consists of an axle $n$, which is rotatably mounted in suitable bearings $o$ on the upper end of vertical bars. To both ends of said axle levers $p$ are fixed, which are connected by a connecting-rod $q$ with the upper end of a rod $r$, which is vertically guided in eyes $s$, the lower end of which rod loosely rests on the platform.

The device operates as follows: The platform is brought into an inclined position by means of stops $f$, which are arranged on the sides of the shaft, so that when the cage stops the respective catch $e$ abuts against the corresponding stop $f$ and lifts the corresponding end of the loose platform $a$, so that the rails on the platform are in an inclined position, Fig. 2. When the wagon now runs onto the platform, it automatically turns one of the curved levers $k$ down, and it raises in consequence the lever $l$, so that an overrunning is prevented. The wagon is prevented from unintentionally leaving the platform during the transport by the safety-bars $p$, which are automatically opened by the lifting of the rod $r$ when the platform is inclined. As soon as the platform has assumed the horizontal position the safety-bars are closed. When the cage has arrived at the pit's head, the platform is automatically inclined in consequence of the cage $e$ gripping under a suitable stop $f$. If the cage is to be used for the transport of persons, the catches are rotated through ninety degrees, so that they come out of the way of the stops.

Having fully described our invention, what we claim, and desire to secure by Letters Patent, is—

An improved mine-cage comprising in combination with the usual cage-frame, a loose platform on said frame, downwardly-projecting catches loosely fixed in the platform, nuts on the upper end of said catches, two parallel or cross axles rotatably mounted in suitable bearings on the lower surface of the platform, curved levers pivoted on the ends of said parallel axles and projecting with their upper ends through the platform, connecting-rods connecting the lower ends of each pair of curved levers and safety-bars at the side of the cage consisting of upright supports fixed to the cage-frame, suitable bearings at the upper end of the same, an axle mounted in said bearings, horizontal levers fixed to the end of said axle, connecting-rods linked to said levers and push-rods loosely resting on the platform with their lower ends and linked with their upper ends to the other end of the connecting-links, there being eyes fixed to the uprights serving as guides for the vertical push-rods, substantially as described and shown and for the purpose set forth.

In testimony whereof we have hereunto set our hands in presence of two subscribing witnesses.

PETER THIELMANN.
JOHANN MEISENBURG.

Witnesses:
PETER LIEBER,
WILLIAM ESSENWEIN.